(12) United States Patent
Knight et al.

(10) Patent No.: US 10,531,187 B2
(45) Date of Patent: Jan. 7, 2020

(54) SYSTEMS AND METHODS FOR AUDIO DETECTION USING AUDIO BEAMS

(71) Applicant: Nortek Security & Control LLC, Carlsbad, CA (US)

(72) Inventors: Laura Elizabeth Knight, San Diego, CA (US); Philip Alan Bunker, Vista, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 82 days.

(21) Appl. No.: 15/387,298

(22) Filed: Dec. 21, 2016

(65) Prior Publication Data

US 2018/0176680 A1    Jun. 21, 2018

(51) Int. Cl.
*H04R 1/40* (2006.01)
*G07C 9/00* (2006.01)
*H04N 7/18* (2006.01)

(52) U.S. Cl.
CPC ......... *H04R 1/406* (2013.01); *G07C 9/00142* (2013.01); *H04N 7/183* (2013.01)

(58) Field of Classification Search
CPC ........... H04R 1/40; H04R 1/406; G10L 15/22; G10L 15/24; G10L 15/00; H04N 7/18; H04N 7/183; G07C 9/00; G07C 9/00142
USPC ...................................................... 348/156
See application file for complete search history.

(56) References Cited

U.S. PATENT DOCUMENTS

| | | | |
|---|---|---|---|
| 4,975,960 A | 12/1990 | Petajan | |
| 5,335,011 A | 8/1994 | Addeo et al. | |
| 5,686,957 A | 11/1997 | Baker | |
| 5,940,118 A | 8/1999 | Van Schyndel | |
| 7,162,043 B2 | 1/2007 | Sugiyama et al. | |
| 7,415,117 B2 | 8/2008 | Tashev et al. | |
| 7,536,029 B2 | 5/2009 | Choi et al. | |
| 7,783,061 B2 | 8/2010 | Zalewski et al. | |
| 7,796,154 B2 | 9/2010 | Senior et al. | |
| 7,883,415 B2 | 2/2011 | Larsen | |
| 8,150,063 B2 | 4/2012 | Chen et al. | |
| 8,229,134 B2 | 7/2012 | Duraiswami et al. | |
| 8,754,925 B2 | 6/2014 | Ng et al. | |
| 8,761,412 B2 | 6/2014 | Hernandez-Abrego et al. | |
| 9,054,764 B2 | 6/2015 | Tashev et al. | |
| 9,171,371 B2 | 10/2015 | Sung et al. | |

(Continued)

FOREIGN PATENT DOCUMENTS

CN    108344973 A    7/2018

*Primary Examiner* — Joseph Suh

(74) *Attorney, Agent, or Firm* — Schwegman Lundberg & Woessner, P.A.

(57) ABSTRACT

An audio beam forming and signal processing system includes at least one image capture device, an array of audio sensors, and a controller. The at least one image capture device is configured to capture images of a monitored zone. The array of audio sensors is configured to detect audio signals from one or more audio sources within the monitored zone. The controller is configured to: analyze at least one image captured by the image capture device to identify an audio source within the monitored zone; determine two or fewer audio source location parameters indicative of the location of the audio source in the monitored zone; and cause the array of audio sensors to form an audio beam directed at the audio source based on the two or fewer audio source location parameters.

20 Claims, 8 Drawing Sheets

(56) References Cited

U.S. PATENT DOCUMENTS

| | | |
|---|---|---|
| 9,197,974 B1 | 11/2015 | Clark et al. |
| 9,258,644 B2 | 2/2016 | Maenpaa et al. |
| 9,330,673 B2 | 5/2016 | Cho et al. |
| 9,392,360 B2 | 7/2016 | Andrea |
| 9,426,568 B2 | 8/2016 | Lakkundi et al. |
| 2002/0067245 A1* | 6/2002 | Campbell .......... G07C 9/00158 340/5.64 |
| 2005/0195989 A1* | 9/2005 | Sato ...................... B25J 13/003 381/92 |
| 2009/0196016 A1* | 8/2009 | Massara ............. F21V 23/0471 362/86 |
| 2010/0037474 A1* | 2/2010 | Hertzman .............. G01C 11/06 33/290 |
| 2011/0164141 A1* | 7/2011 | Tico .................... G10L 21/0208 348/207.99 |
| 2012/0215537 A1* | 8/2012 | Igarashi ................. G06F 3/167 704/249 |
| 2012/0259638 A1 | 10/2012 | Kalinli |
| 2012/0330684 A1* | 12/2012 | Jacobs .................... H04N 7/18 705/3 |
| 2014/0085538 A1* | 3/2014 | Kaine .................... H04N 9/802 348/462 |
| 2014/0270194 A1* | 9/2014 | Des Jardins ........ G10L 21/0224 381/56 |
| 2015/0085131 A1* | 3/2015 | Anderson ............. H04N 7/181 348/157 |
| 2015/0160797 A1* | 6/2015 | Shearer ................ G06F 3/0482 715/740 |
| 2015/0358752 A1* | 12/2015 | Orman ................. G01S 3/8022 381/56 |
| 2016/0126626 A1* | 5/2016 | Sakai ................... H01Q 1/1264 318/569 |
| 2016/0249134 A1* | 8/2016 | Wang .................... H04R 3/005 |
| 2017/0070837 A1* | 3/2017 | De Poortere ........... H04S 7/302 |
| 2017/0104929 A1* | 4/2017 | Ono ....................... G02B 13/00 |
| 2017/0184712 A1* | 6/2017 | Shiba ...................... G01S 7/524 |
| 2018/0168755 A1* | 6/2018 | Cagle ..................... A61B 34/35 |
| 2018/0288307 A1* | 10/2018 | Allie .................. H04N 5/23212 |
| 2018/0306890 A1* | 10/2018 | Vatcher ................. G01S 3/8083 |

\* cited by examiner

SYSTEMS AND METHODS FOR AUDIO DETECTION USING AUDIO BEAMS

DESCRIPTION OF DRAWINGS

In the drawings, which are not necessarily drawn to scale, like numerals may describe similar components in different views. Like numerals having different letter suffixes may represent different instances of similar components, subcomponents of a larger logical or physical system, or the like. The drawings illustrate generally, by way of example, but not by way of limitation, various examples described in the present disclosure.

DETAILED DESCRIPTION

Figure 1:
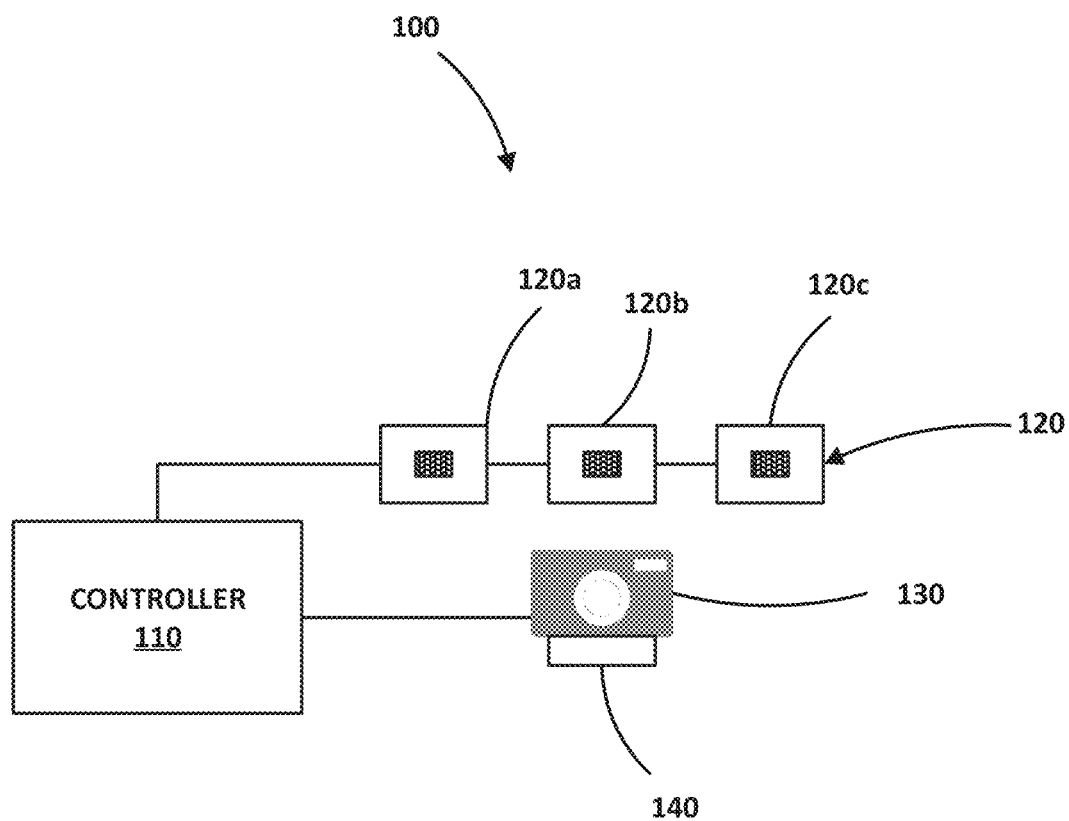
FIGS. 1, 2A and 2B depict an example audio beam forming and signal processing system in accordance with this disclosure.

The inventor(s) recognize, among other things, an opportunity for improving detection and processing of far field audio signals to improve speech recognition and processing by electronic devices. Examples according to this disclosure are applicable to a variety of practical technical applications, including for example, home/premises/facility security and/or automation, Personal Emergency Response systems (PERS), physical access control systems, among others.

In one example according to this disclosure, a system includes an audio sensor array, an image capture device, and a controller or other electronic device cable of storing and processing, inter alia, signals and/or data sensed and/or generated by the audio sensor array and the image capture device. In general, the image capture device is configured to periodically or continuously capture digital images of a monitored zone (also referred to as field of view). The images captured by the image capture device are processed by the controller to identify objects of interest within the field of view of the image capture device. Once an object of interest is identified, the controller determines the location of the object or determines the value of a parameter that is indicative of the location of the object in the monitored zone. The controller then uses the object location or indicative parameter to form an audio beam directed at the object to detect audio signals emanating from the object. The audio beam is formed by the controller gaining up audio signals sensed by the audio sensor array within a beam zone and attenuating signals outside of the beam zone. The controller then processes the audio signals sensed by the audio sensor array within the beam zone.

The controller can process the audio signals from the beam zone for a number of different purposes and to execute a number of different functions. For example, the controller can be configured to execute speech recognition algorithms to receive and execute commands vocalized by a user of the system. These commands or other types of input received from such a user and recognized by the system can cause various results, actions, effects, et cetera to occur including, for example, arming/disarming an alarm, raising or lowering the heat in a home, turning on/off a light, raising or lowering the volume of music, selecting an audio track to play, determining or supplementing and algorithmic determination that a user has fallen and cannot get up, among others.

Systems and methods in accordance with this disclosure are configured to locate, target and track an audio source with an audio beam that is defined by two or fewer audio source location parameters. For example, systems in accordance with this disclosure can be configured to form an audio beam directed at an audio source of interest using one or both of an angle in a horizontal plane generally parallel to a reference datum plane and/or an angle in a vertical plane generally perpendicular to the reference datum plane. The reference datum plane can be, but does not necessarily have to be the ground, floor or other planar surface upon which people and objects stand, sit, lie, et cetera.

In one example, the audio beam is formed using an angle at which the audio source of interest is located in a horizontal plane approximately parallel to the ground. The audio beam is horizontally aligned to the audio source and vertically elongated. The vertical elongation of the audio beam removes the need to determine the vertical location of the audio source, for example, the location of a user's face or head relative to the position of the audio sensor array.

In one example, the audio beam is formed using an angle at which the audio source of interest is located in a vertical plane approximately perpendicular to the ground. The audio beam is vertically aligned to the audio source and horizontally elongated. The horizontal elongation of the audio beam removes the need to determine the horizontal location of the audio source, for example, the location of a person sitting or standing or otherwise disposed to the left or right relative to the position of the audio sensor array.

In one example, the audio beam is formed using both the horizontal and vertical angles described in the foregoing two examples. Notably, however, processing of the beam is simplified by calculating the horizontally aligned and vertically elongated beam and the vertically aligned and horizontally elongated beam and summing the two beams to form the audio beam directed at the audio source of interest.

Examples employ a camera or multiple cameras (or other image capture devise(s)) and processor with computer vision algorithms, programs, et cetera to perform object detection. When an object is detected within the camera's field-of-view, an audio detection beam is aimed at the object and adjusted real-time as the object moves within the camera's field-of-view.

Two example systems are disclosed by which the audio beam is formed using two or fewer audio source location parameters. In one example, the system includes an image capture device mounted to one or more servo motors, which are configured to pan the image capture device, for example, left and right, and/or tilt the image capture device, for example, up and down. The image capture device periodically or continuously captures images of a monitored area (also referred to as field of view). The images captured by the image capture device are processed by the controller to identify objects of interest within the field of view of the image capture device. The controller then controls the servo motor(s) to center the image capture device field of view either or both horizontally and/or vertically on the audio source. The controller receives or requests and receives the horizontal and/or vertical angle of the servo motor(s) so centered on the audio source and forms the audio beam therefrom.

In another example, the system includes one or more image capture devices having an actual or effective lens angle that spans an entire zone of interest within which objects of interest might reside. For example, a camera with a wide angle lens can be mounted to a wall of a room and the angle of the lens can be approximately 160 degrees such that the camera can capture images of almost the entire room without moving. In another example, an array of cameras can be employed and the images from each camera can be stitched together to form a view of all or almost all of the room without moving. In these examples, the images captured by the image capture device(s) are processed by the controller to identify objects of interest within the field of view of the image capture device(s). The processor can then use the resolution of the captured images and the actual or effective lens angle of the image capture device(s) (both fixed values) to determine the horizontal and/or vertical angle of the audio source and forms the audio beam therefrom.

Figure 2A:
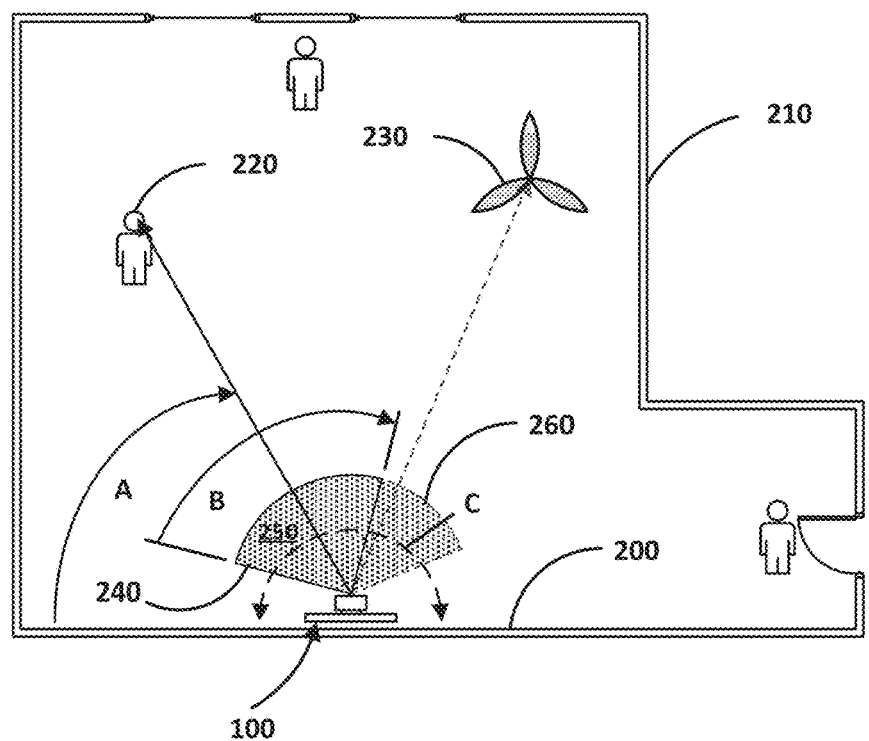
Figure 2B:
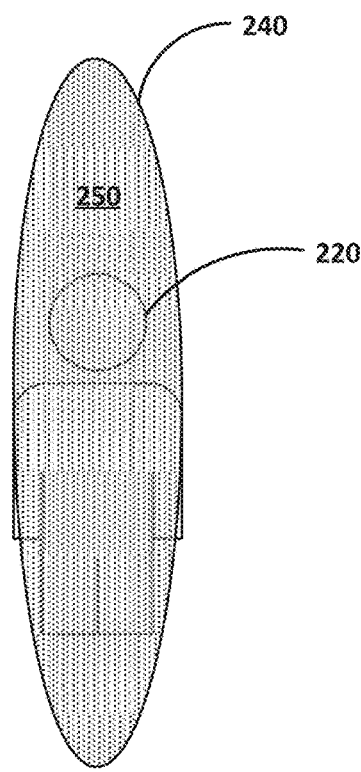

FIGS. 1, 2A and 2B depict an example audio beam forming and signal processing system 100 in accordance with this disclosure. Referring to FIG. 1, system 100 includes controller 110, audio sensor array 120, image capture device 130, and image capture device mount 140. Controller 110, audio sensor array 120, image capture device 130 are communicatively connected such that the components can send and receive signals from one another. Image capture device 130 is mounted to a stationary structure by mount 140 and audio sensor array 120 is mounted to the structure in a horizontal, side-by-side arrangement above image capture device 130. In another example, audio sensor array 120 can be mounted in a horizontal, side-by-side arrangement below image capture device 130. Controller 110 can be co-located with or remote from audio sensor array 120 and image capture device 130. Audio sensor array 120 and image capture device 130 are at a known position relative to one another. In this example, audio sensor array 120 includes three audio sensors 120a, 120b, and 120c. However, in other examples according to this disclosure the audio sensor array can include any number of two or more audio sensors.

Controller 110 can include a number of different physical and/or logical components and can be implemented in software, hardware, and combinations thereof. For example, controller 110 can include one or more processors, memory, wireless transceiver, audio codec, among other components, circuits, modules, et cetera. Controller 110 can be communicatively connected to and configured to communicate with audio sensor array 120 and image capture device 130 in a variety of ways. In one example, controller 110 includes a processor and an audio codec. The audio codec is connected to audio sensor array 120 and configured to communicate with the processor over a Serial Peripheral Interface (SPI) bus. In one example, image capture device 130 is connected to controller 110 via a Universal Serial Bus (USB). In examples in which image capture device 130 is coupled to one or more servo motors, such motors can be connected to/communicate with controller 110 via a General-purpose input/output (GPIO). Additional examples of the manner in which components of examples according to this disclosure are communicatively connected include wired connections including IEEE 1394 or "Firewire," Ethernet, High Definition Media Interface (HDMI), and wireless connections including WiFi™, Bluetooth®, Zigbee®, and the like. An example of controller 110 is depicted and described in more detail with reference to FIG. 6.

Audio sensor array 120 and image capture device 130 are co-located with one another and mounted to a stationary structure such that the location of audio sensor array 120 relative to the image capture device 130 is known and fixed. For example, audio sensor array 120 and image capture device 130 can be mounted to a vertical wall of a room as depicted in FIG. 2A. The known relative location of audio sensor array 120 and image capture device 130 allows the horizontal and/or vertical angle used to form the audio beam to be transformed from the position of the image capture device from which the angle(s) is/are determined to the position of the audio sensor array by which the audio beam is formed.

Although audio sensor array 120 and image capture device 130 are depicted as separate components, in other examples a single device including, for example, a video camera multiple cameras or other image capture devices) and microphone array can be employed in examples according to this disclosure. In one such example, audio sensor array 120 and image capture device 130 are incorporated into the same device, but the audio sensor array is stationary and image capture device is configured to pan and/or tilt. In such a case, controller 110 can be configured to transform the horizontal and/or vertical angle used to form the audio beam from the position of the image capture device from which the angle(s) is/are determined to the position of the audio sensor array by which the audio beam is formed. In another example, however, such transformation may not be necessary as where both audio sensor array 120 and image capture device 130 are incorporated in the same device and are both stationary.

Audio sensor array 120 can include a variety of different types of audio sensors. In one example, audio sensor array 120 includes two or more microphones. In an example, each microphone of audio sensor array 120 is omni-directional to provide the array with a large sensing zone. The microphones or other types of sensors in audio sensor array 130 can include any number of two or more microphones, arranged in a variety of geometrical configurations.

Image capture device 130 can include a variety of different types of digital devices configured to capture and store digital images of objects and scenes. In one example, image capture device 130 includes a standard or high definition video camera. In one example, image capture device 130 includes a still image camera. In some examples, image capture device 130 includes a video or still image camera with a wide angle lens having a lens angle of, for example, up to and including approximately 160 degrees such that the camera can capture images of almost an entire room without moving. In another example, image capture device 130 includes an array of cameras or one camera that is configured to pan, tilt, or otherwise change its position/orientation to capture multiple images. In such examples, controller 110 can include one or more algorithms that are configured to stitch together the images captured by each camera in the camera array to form a view of all or almost all of the room without moving.

Image capture device mount 140 can include a variety of devices or systems configured to mount image capture device 130 (and, in some cases, audio sensor array 120) to a stationary structure like the wall, floor, or ceiling in a room or other space. For example, mount 140 of FIGS. 1, 2A and 2B mounts image capture device 130 to a vertical wall 200 of a room 210. In one example, mount 140 includes or secures one or more servo motors configured to pan image capture device 130, for example, left and right, and/or tilt the image capture device, for example, up and down.

Referring to FIGS. 2A and 2B, image capture device 130 is configured to periodically or continuously capture images of a monitored area (also referred to as field of view), which in this example is all or a substantial portion of room 210. The actual or effective field of view is schematically represented by angle C, which may be equal to a variety of actual or effective camera lens angles up to and including approximately 160 degrees. The images captured by image capture device 130 are processed by controller 110 to identify objects of interest within room 210. For example, controller 110 can process images from image capture device 130 to identify people for the purpose of receiving voice commands. In FIG. 2A, there are a number of objects of possible interest including person 220 and fan 230. In one example, controller 110 of system 100 identifies person 220 and is configured to determine the location of person 220 or determine the value of a parameter that is indicative of such location in room 210.

Controller 110 can identify objects of interest in a number of ways. For example, controller 110 can store and execute computer vision algorithms, which are also sometimes referred to as object or face recognition algorithms or programs. Such programs are configured to identify particular categories of objects in a digital image, including, for example, the face of a person. In an example, controller 110 stores and executes algorithm for identifying a person in room 210 using facial recognition including a Haar Cascade function, Haar cascades may enable rapid face detection using cascade classifiers. For example, a cascade function is trained with a number of, e.g. hundreds of positive and negative images, where a positive image contains a face and a negative image does not contain a face. The function extracts feature sets from portions of the training images known as Haar features. Using the set of training images, the algorithm selects the best correlated features to classify the image as positive (face) or negative (non-face). The algorithm then applies these feature correlations to an image captured by image capture device 130 to identify faces of people in the field of view. The algorithm can process the image by discretizing the image into a number of regions and applying the cascade function iteratively to each region to determine whether or not the region contains features correlated to the face of a person.

A variety of other facial or other object detection/recognition techniques can be employed in examples according to this disclosure. In one example, controller 110 is installed with Open CV 3.0.0 or Open Source Computer Vision library, which is released under the BSD open source license. This library contains pre-trained classifiers for faces, stored as XML files and can be used to identify both frontal and profile views of the face of a person.

Audio beam forming and audio signal processing system 100 is configured to locate, target and track an audio source with an audio beam using two or fewer audio source location parameters to define the audio beam. In the example of FIGS. 2A and 2B, controller 110 identifies person 220 as a potential audio source, for example, from which to receive voice commands, and is configured to determine the location of person 220 using two or fewer audio source location parameters. In one example, controller 110 determines an angle A indicative of the location of person 220, where angle A is an angle in a horizontal plane generally parallel to a reference datum plane, which is the floor or ground on which person 220 sits, stands, lies, et cetera. The horizontal angle A is defined depending upon the manner in which system 100 is mounted. In this example, angle A is in the horizontal plane parallel to the floor measured from the wall on which system 100 is mounted to a vector from the center of image capture device 130 to a vertical centerline of person 220.

Controller 110 can determine angle A in a number of different ways. In examples in which image capture device 130 is mounted to a servo motor that pans device 130 left to right, controller 110 can employ a computer vision algorithm to identify person 220 in images captured by device 130. Controller 110 can then control the servo motor to center the field of view of image capture device 130 on person 220. Controller 110 can read the angle of servo motor directly off of the device to determine the horizontal angle A of person 220 in room 210.

In one example, a servo motor that pans image capture device 130 left/right is connected to controller 110 or a module thereof via three wires, including a power wire, a ground wire, and a General Purpose Input Output (GPIO) wire. The GPIO is programmed to output a Pulse-Width Modulated (PWM) signal from controller 110 to the servo motor that is active high for a specific amount of time. The duration of time that the pulse is high sets the position, pan angle of the servo motor. For example, when controller 110 outputs a 1.5 ms high pulse to the servo motor, the motor will move to a neutral 90 degree position. When controller 110 outputs a shorter 1.0 ms high pulse to the servo motor, the motor will move closer to the 0 degree position. And, when controller 110 outputs a longer 2.0 ms high pulse to the servo motor, the motor will move closer to the 180 degree position.

In one example, the lower and upper limits of the high pulse duration can be set so a particular servo motor used does not overdrive the angle of mechanical rotation. Additionally, in some examples, controller 110 can read the position of the servo motor on which image capture device 130 is mounted, as servo motors commonly have a sensor for position feedback.

In one example, controller 110 executes an algorithm, program, et cetera that runs a loop that selects an image from image capture device 130 and applies an object detection algorithm to detect a specific object (for example, a face). If no object is detected, the loop keeps running and selecting subsequent images captured by image captured device 130, trying to find the object (for example, as device 130 pans left and right horizontally across room 210). If the object is detected, the code will read the coordinates of the object location relative to the resolution of the camera. If (0,0) is the bottom left coordinate of the image resolution, and the total resolution is 640×480, controller 110 could detect an object anywhere within the x range 0 to 640 and the y range 0 to 480. In one example, using the x range only, the centerline of the image is equal to the resolution divided by two (640/2=320). When an object is detected at (100, 20), controller 110 determines that the object is to the left of the centerline because 100<320. In response, controller 110 can pan image capture device 130 left in an effort to center the object in the frame/field of view of image capture device 130. Similarly, if the object is detected at (400, 20), controller 110 determines that the object is to the right of the centerline because 400>320, and device 130 pans right in an effort to center the object in the frame. In this manner, in one example, controller 110 and image capture device 130 can track person 220 using the servo motor to pan left or right.

Once person 220 is centered horizontally (or in the x direction) in the frame or field of view of image capture device 130 (for example, 320, y), controller 110 reads the position of the servo motor, which in the example depicted in FIG. 2A can be anywhere in a 180 degree field of view. The servo motor positions can be associated with a variety of horizontal angles stored in a table, database or other data storage mechanism of controller 110 in a calibration step. For example, if controller 110 reads a servo motor position of 140 (1.4 ms high pulse), and the controller can cross-reference this value in a database to see that 140 motor position is equal to an angle A of 81 degrees.

In another example, image capture device 130 is stationary and has an actual or effective field of view that covers all or a substantial portion of room 210. In such cases, controller 110 executes a computer vision algorithm to identify person 220 in an image captured by image capture device 130. After person 220 has been detected/identified in the image, controller 110 can use the resolution of the captured image and the actual or effective lens or sensing angle of image capture device 130 (both fixed values) to determine the horizontal angle A of person 220. As noted, in this example image captured device 130 is stationary and, in the event person 220 moves inside room 210, controller 110 repeatedly executes the computer vision algorithm to identify and locate person 220, and thereby track the person within the room.

Once controller 110 determines angle A, and thereby horizontally locates person 220 in room 210, the controller can be configured to form and direct an audio beam 240 at person 220. Audio beam 240 can be defined rapidly by horizontally centering a vertically elongated cone (or other) shaped beam zone 250 on person 220. An example of this is depicted in FIGS. 2A and 2B with FIG. 2A schematically depicting the horizontal component of beam zone 250 and FIG. 2B schematically depicting the horizontal and vertical components of beam zone 250 of audio beam 240. The angle B can be a fixed value defining the horizontal size of audio beam 240 and the vertical component of the audio beam/ beam zone 250 can be elongated to a fixed height that spans a given space, for example the distance from floor to ceiling of a room. In this manner, audio beam 240 formed by controller 110 is horizontally aligned to the audio source, person 220 and vertically elongated. The vertical elongation of audio beam 240 removes the need to determine the vertical location of the audio source, for example, the location of the face or head of person 220 relative to the position of audio sensor array 120 of system 100. In one example, the audio beam angle B is equal to approximately 20 degrees.

Referring again to FIG. 2A, in addition to sources of sound of potential interest in room 210, there may also be sources of noise, which it may be desirable/advantageous to filter out of signals received by audio sensor array 120 for the purpose of, for example, far field voice/speech recognition. Fan 230, for example, can be a source of noise. In one example, controller 110 is configured to analyze images captured by image capture device 130 to identify fan 230 as a source of noise in room 210, determine one or more parameters indicative of the location of the source of noise, and cause audio sensor array 120 to form an audio beam based on the location parameters to direct a second audio beam 260 at and to detect audio signals from fan 230. Controller 110 can identify, locate and direct audio beams at noise sources in a similar manner as described above for identifying, locating, and directing audio beams at sources of sound of potential interest, for example, person 220. Controller 110 can use signals received by audio beam 260 directed at noise source, fan 230 to improve signals received by audio beam 240 directed at person 220. For example, controller 110 can subtract audio signals from the signals received by audio beam 240 that are similar or the same as the audio signals received by audio beam 260.

Figure 3:
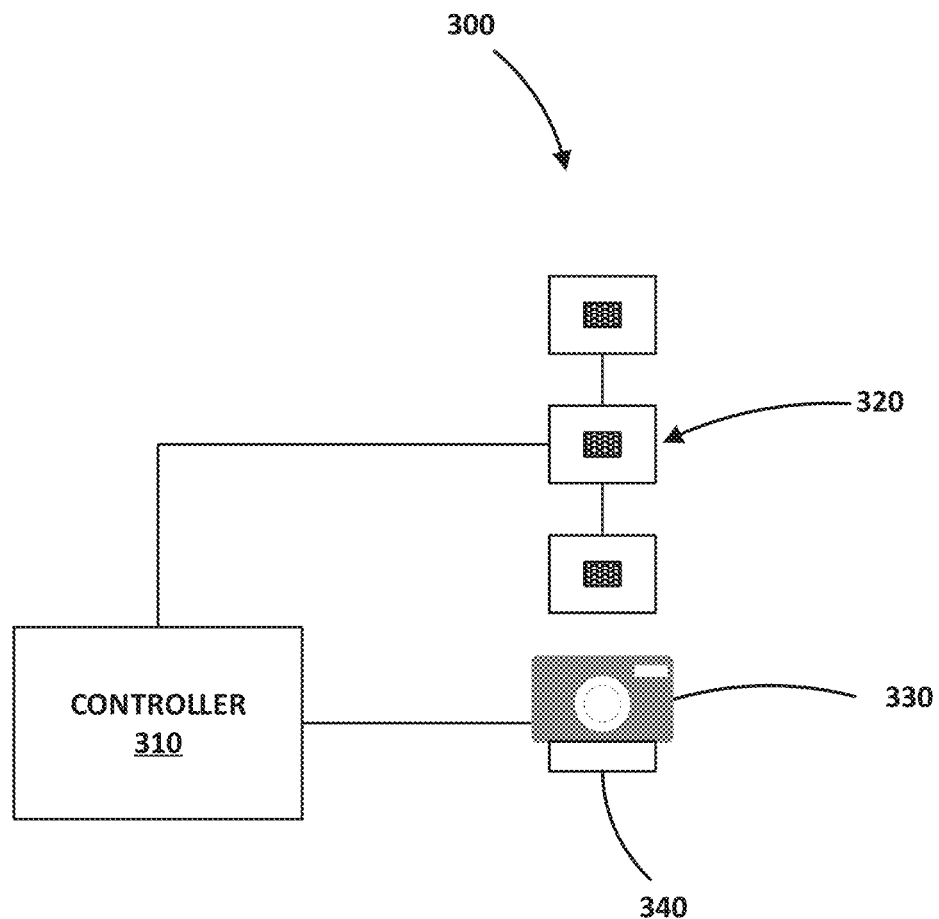
FIGS. 3, 4A and 4B depict another example audio beam forming and signal processing system in accordance with this disclosure.
Figure 4A:
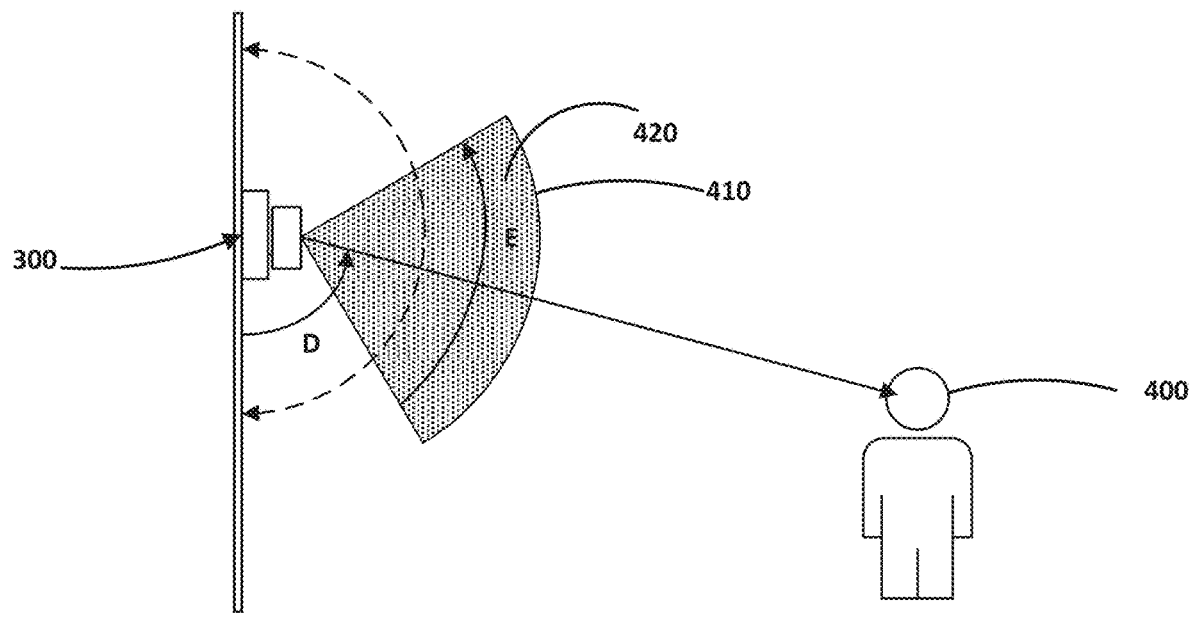
Figure 4B:
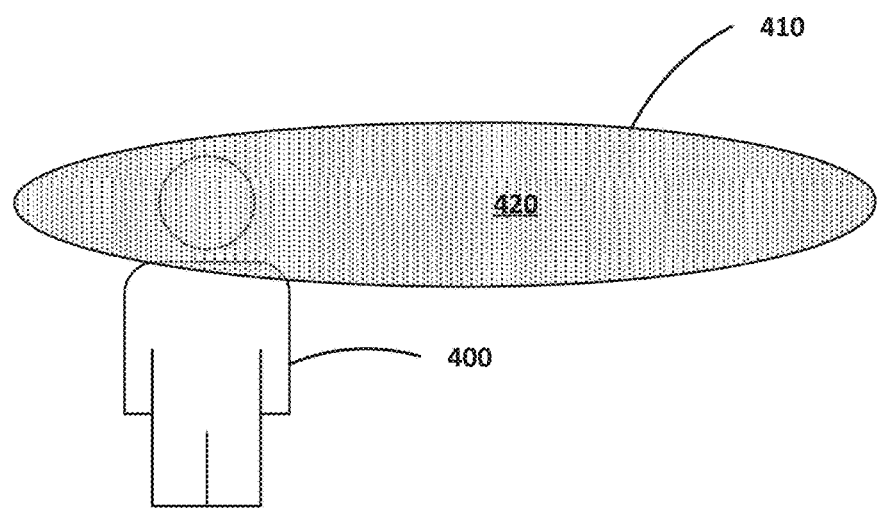

FIGS. 3, 4A and 4B depict an example audio beam forming and audio signal processing system 300 in accordance with this disclosure. Referring to FIG. 3, system 300 includes controller 310, audio sensor array 320, image capture device 330, and image capture device mount 340. Controller 310, audio sensor array 320, image capture device 330 are communicatively connected such that the components can send and receive signals from one another. Image capture device 330 is mounted to a stationary structure by mount 340 and audio sensor array 320 is mounted to the structure in a vertically stacked arrangement above image capture device 330. In another example, audio sensor array 320 can be mounted in a vertically stacked arrangement below image capture device 330. Controller 310 can be co-located with or remote from audio sensor array 320 and image capture device 330. Audio sensor array 320 and image capture device 330 are at a known position relative to one another, in this example, audio sensor array 320 includes three audio sensors. However, in other examples according to this disclosure the audio sensor array can include any number of two or more audio sensors.

System 300 and the components thereof, including controller 310, audio sensor array 320, image capture device 330, and mount 340 can be substantially similar to controller 110, audio sensor array 120, image capture device 130 and mount 140 described above with reference to FIGS. 1, 2A and 2B. However, system 300 is adapted to form an audio beam using an angle at which an audio source of interest is located in a vertical plane approximately perpendicular to the ground. The audio beam, in this example versus the example of FIGS. 1, 2A and 2B, is vertically aligned to the audio source and horizontally elongated.

Referring to FIGS. 3, 4A and 4B, audio beam forming and audio signal processing system 300 is configured to locate, target and track an audio source with an audio beam using two or fewer audio source location parameters to define the audio beam. In the example of FIGS. 4A and 4B, controller 310 identifies person 400 as a potential audio source, for example, from which to receive voice commands, and is configured to determine the location of person 400 using two or fewer audio source location parameters. In one example, controller 310 determines an angle D indicative of the location of person 400, where angle D is an angle in a vertical plane generally perpendicular to a reference datum plane, which is the floor or ground on which person 400 sits, stands, lies, et cetera. The vertical angle D is defined depending upon the manner in which system 300 is mounted. In this example, angle D is in the vertical plane perpendicular to the floor measured from the wall on which system 300 is mounted to a vector from the center of image capture device 330 to, for example, near the center of the face of person 400.

Controller 310 can determine angle D in a number of different ways. In examples in which image capture device 330 is mounted to a servo motor that tilts device 330 up and down, controller 310 can employ a computer vision algorithm to identify person 400 in images captured by device 330. Controller 310 can then control the servo motor to center the field of view of image capture device 330 on person 400. Controller 310 can read the angle of servo motor directly off of the device to determine the horizontal angle D of person 400. The particular algorithm, programs, controls, et cetera employed by controller 310 can vary and can include similar techniques as set forth above with reference to controller 110 except that, in this example, controller 310 is determining vertical angle D to vertically locate person 400 in the scene/field of view captured by image capture device 330.

In another example, image capture device 330 is stationary and has an actual or effective field of view that covers all or a substantial portion of the space in which person 400 resides. In such cases, controller 310 executes a computer vision algorithm to identify person 400 in an image captured by image capture device 330. After person 400 has been detected/identified in the image, controller 310 can use the resolution of the captured image and the actual or effective lens or sensing angle of image capture device 330 (both fixed values) to determine the vertical angle D of person 400. As noted, in this example image captured device 330 is stationary and, in the event person 400 moves, controller 310 can repeatedly execute the computer vision algorithm to identify and locate person 400, and thereby track the movement of the person.

Once controller 310 determines angle D, and thereby vertically locates person 400, the controller can be configured to form and direct an audio beam 410 at person 400. Audio beam 410 can be defined rapidly by vertically centering a horizontally elongated cone (or other) shaped beam zone 420 on person 400. An example of this is depicted in FIGS. 4A and 4B with FIG. 4A schematically depicting the vertical component of beam zone 420 and FIG. 2B schematically depicting the horizontal and vertical components of beam zone 420 of audio beam 410. Referring to FIG. 4A, the angle E can be a fixed value defining the vertical size of audio beam 410 and the horizontal component of the audio beam/beam zone 420 can be elongated to a fixed width that spans a given space, for example the distance from one side wall to an opposite side wall of a room. In this manner, audio beam 410 formed by controller 310 is vertically aligned to the audio source, person 400 and horizontally elongated. The horizontal elongation of audio beam 410 removes the need to determine the horizontal location of the audio source, for example, where person 400 is standing left-to-right relative to the position of audio sensor array 320 of system 300. In one example, the audio beam angle E is equal to approximately 20 degrees.

Figure 5A:
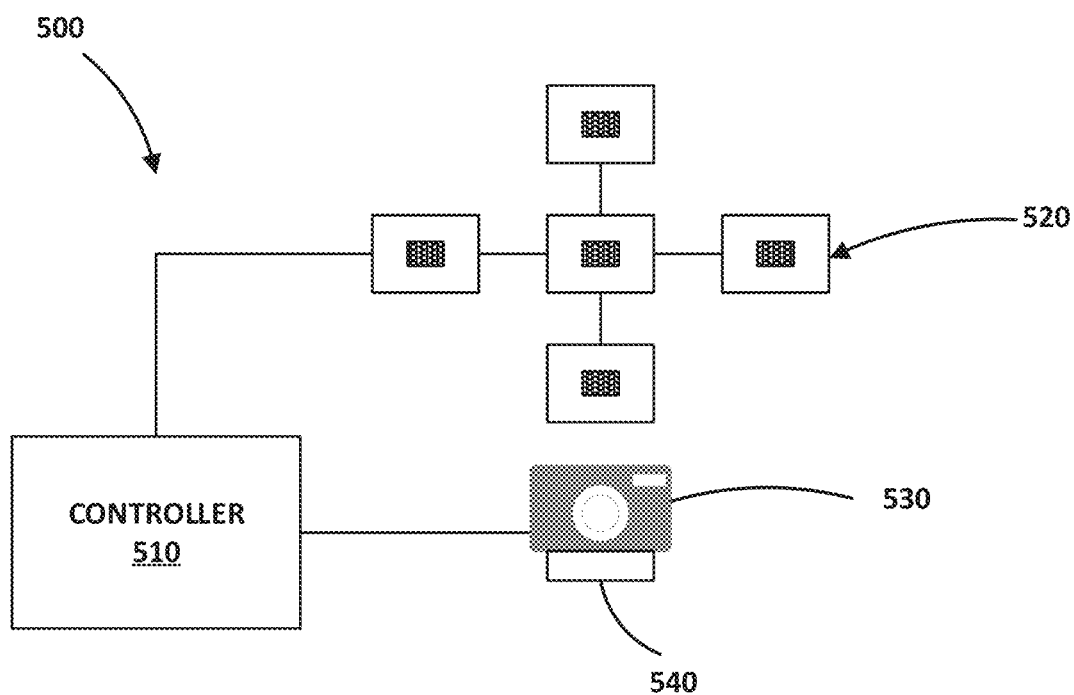
FIGS. 5A and 5B depict another example audio beam forming and signal processing system in accordance with this disclosure.
Figure 5B:
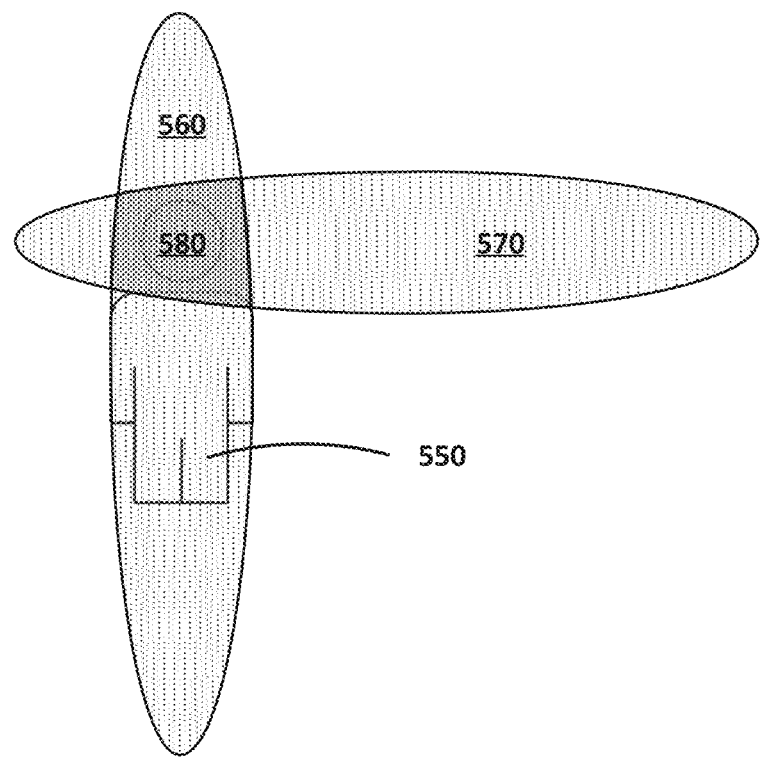

FIGS. 5A and 5B depict another example audio beam forming and audio signal processing system 500 in accordance with this disclosure. System 500 includes controller 510, audio sensor array 520, image capture device 530, and image capture device mount 540. Controller 510, audio sensor array 520, image capture device 530 are communicatively connected such that the components can send and receive signals from one another. Image capture device 530 is mounted to a stationary structure by mount 540. Audio sensor array 520 is mounted to the same structure as image capture device 530, for example, a vertical wall of a room. Audio sensor array 520 includes both a horizontal, side-by-side bank of sensors and a vertically stacked bank of audio sensors above image capture device 530. In another example, audio sensor array 520 can be mounted below image capture device 530. Controller 510 can be co-located with or remote from audio sensor array 520 and image capture device 530. Audio sensor array 520 and image capture device 530 are at a known position relative to one another.

In this example, audio sensor array 520 includes 5 audio sensors. However, in other examples according to this disclosure the audio sensor array can include any number of two or more audio sensors. Audio sensor array 520 is one example of an array that may be used by controller 510 (or another controller in accordance with this disclosure) to form both a horizontally located and vertically elongated audio beam and a vertically located and horizontally elongated audio beam.

In the example of FIGS. 5A and 5B, controller 510 is configured to identify the location of person 550 as a source of sound of potential interest in a manner similar as described with the examples of FIGS. 1-4B. In this example, however, controller 510 combines the example audio beam locating and forming of the example of FIGS. 1, 2A and 2B with the example audio beam locating and forming of the example of FIGS. 3, 4A and 4B.

For example, controller 510 is configured to identify person 550 in one or more images captured by image capture device 530. Controller 510 can identify person 550 (and other sources of sound of potential interest) using various computer vision and object detection algorithms and techniques, as described above. Controller 510 determines two audio source location parameters indicative of the position of person 550. For example, controller 510 determines a horizontal angle in a horizontal plane parallel to a reference datum plane upon which person 550 is arranged and a vertical angle in a vertical plane perpendicular to the reference datum plane. Controller 510 can determine the horizontal and vertical angles in a manner similar to that described with reference to calculating angles A and D in the examples of FIGS. 1-4B. In one example, system 500 includes one or more servo motors that are configured to pan image capture device 530 left and right and to tilt image capture device 530 up and down. In such cases, controller 510 can be configured to determine the horizontal and vertical angles based on the positions of the servo motor(s) when person 550 is centered in the field of view of image capture device 530.

After determining the horizontal and vertical angles indicative of the position of person 550, controller 510 can calculate a first audio beam 560 that is aligned with person 550 horizontally and is vertically elongated using the horizontal angle and calculate a second audio beam 570 that is aligned with person 550 vertically and is horizontally elongated using the vertical angle. Controller 510 can then cause audio sensor array 520 to form the audio beam 580 as a sum of the first calculated audio beam 560 and the second calculated audio beam 570. The audio beam 580 is thereby horizontally and vertically aligned with person 550. Additionally, forming the audio beam 580 can be done in a programmatically relatively simple manner as the beam is so located using only two audio source location parameters and then simply summing the first calculated audio beam 560 and the second calculated audio beam 570, each of which is calculated by controller 530 based on a single parameter.

One example according to this disclosure includes a system including a controller that is configured to identify and locate a source of sound of potential interest and to form an audio beam directed at the audio source using only one of the techniques described in FIGS. 1, 2A and 2B, FIGS. 3, 4A and 4B, or FIGS. 5A and 5B. In another example, a controller in accordance with this disclosure is configured to identify and locate a source of sound of potential interest and to form an audio beam directed at the audio source using one or more of the techniques described in FIGS. 1, 2A and 2B, FIGS. 3, 4A and 4B, and FIGS. 5A and 5B. In the latter case(s), the controller may be configured to select one of these example techniques based on various factors. For example, the characteristics of the space in which sources of sound are arranged may make one of the examples of FIGS. 1, 2A and 2B, FIGS. 3, 4A and 4B, and FIGS. 5A and 5B more advantageous/accurate than the others. In another example, a user or installation technician may set the system to cause the controller to use one of the examples of FIGS. 1, 2A and 2B, FIGS. 3, 4A and 4B, and FIGS. 5A and 5B to identify and locate sources of sound of potential interest and to form an audio beam directed at the audio source.

Figure 6:
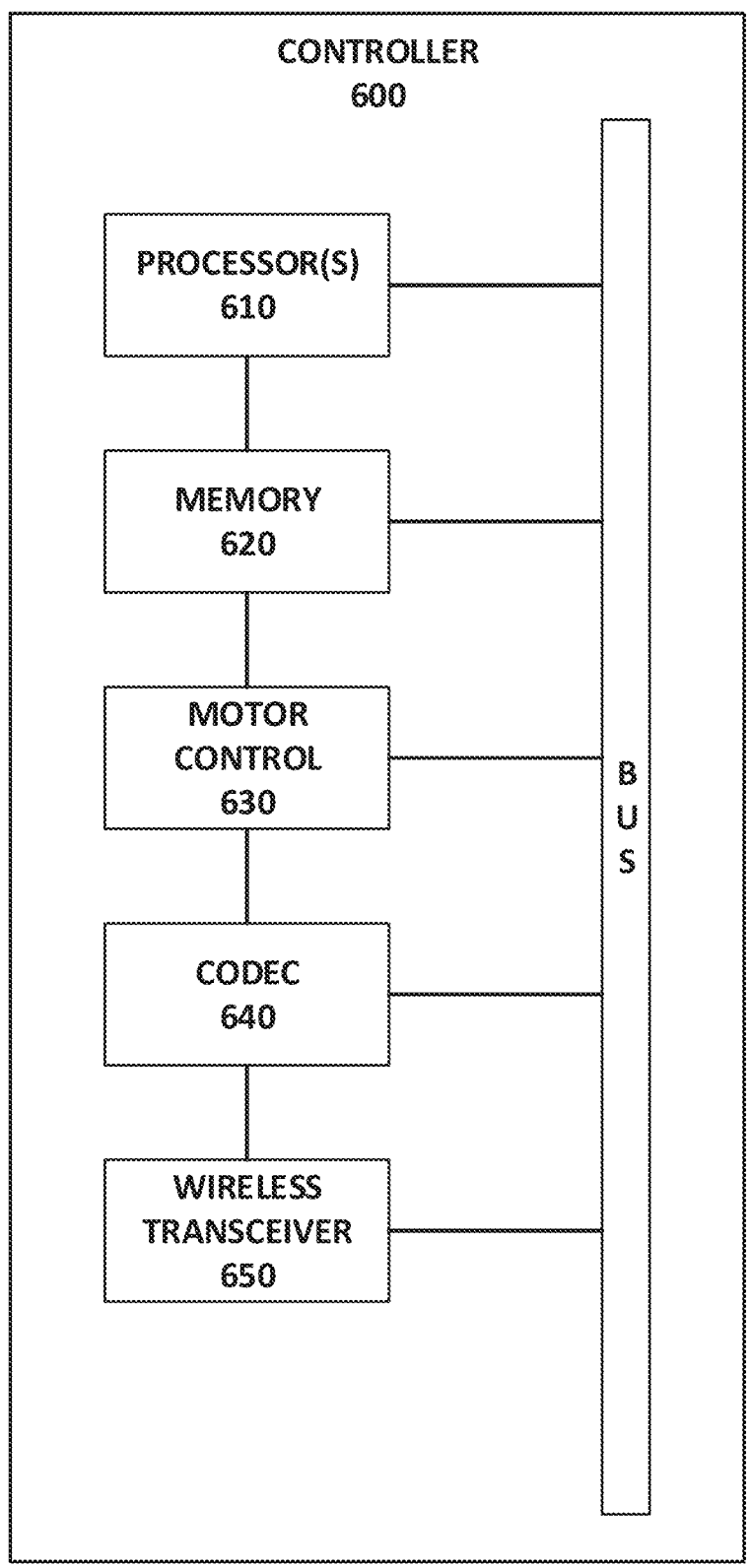
FIG. 6 depicts a controller included in audio beam forming and signal processing systems in accordance with this disclosure.

FIG. 6 depicts an example controller 600 in accordance with examples of this disclosure. Example controller 600 includes processor(s) 610, memory 620, motor control 630, audio CODEC (encoder/decoder) 640, and wireless transceiver 650 communicatively connected by a bus. Controller 600 can be used in audio beam forming and audio signal processing systems in accordance with this disclosure, including systems 100, 300, 500 and 700 (described below with reference to FIG. 7).

Processor(s) 610 (hereinafter "processors 610"), in one example, are configured to implement functionality and/or process instructions for execution by controller 600 and other controllers in accordance with this disclosure. For example, processors 610 are capable of processing instructions stored at memory 620, which include, in some examples, instructions for executing functions attributed to controller 110, controller 310, and/or controller 510. Examples of processors 610 include any one or more of a microprocessor, a controller, a digital signal processor (DSP), an application specific integrated circuit (ASIC), a field-programmable gate array (FPGA), or equivalent discrete or integrated logic circuitry. In one example, processors 610 include a Raspberry Pi 2 Model B 900 MHz quad-core central processing unit (CPU).

Memory 620 can be configured to store information, data, signals, et cetera within controller 600 during operation. Memory 620, in some examples, are described as a computer-readable storage medium. In some examples, memory 620 include a temporary memory, meaning that a primary purpose of one or more memory 620 is not long-term storage. Memory 620 is, in some examples, described as a volatile memory, meaning that memory 620 does not maintain stored contents when the computer is turned off. Examples of volatile memories include random access memories (RAM), dynamic random access memories (DRAM), static random access memories (SRAM), and other forms of volatile memories known in the art. In some examples, memory 620 is used to store program instructions for execution by processors 610, including, for example, algorithms for object detection/identification and audio beam forming. Memory 620, for example, is used by software or applications running on controller 610 to temporarily store information during program execution.

Memory 620, in some examples, also include one or more computer-readable storage media. Memory 620 can be configured to store larger amounts of information, data, signals, et cetera than volatile memory. Memory 620 can further be configured for long-term storage of information. In some examples, memory 620 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Motor control 630 can be configured to control servo motors or other mechanisms by which an image capture device is articulated in examples according to this disclosure. Motor control 630 can be implemented in software, hardware, and combinations thereof. For example, motor control 630 can be a software, logical module executed or included in processors 610 and configured to communicate with one or more servo motors coupled to an image capture device. In another example, motor control 630 can be circuit(s) or circuit boards coupled to processor 610 and one or more servo motors or other articulation mechanisms.

Audio CODEC 640 is configured to encode, decode, and otherwise process audio signals detected by an audio sensor array connected to controller 600. In some examples, the functions of audio CODEC 640 are included in and executed by processors 610. In other examples, audio CODEC 640 is a separate logical or physical component. In one example, audio CODEC 640 is a Microsemi ZL38051 Audio Codec.

Wireless transceiver 650 is configured to transmit information, data, signals, et cetera from and receive information, data, signals, et cetera at controller 600. Wireless transceiver 650 can communicatively connect controller 600 and the associated audio beam forming and audio signal processing system to other electronic systems, including, for example, a home security or automation system. Wireless transceiver 650 can include one or multiple components to enable various forms of wireless communications, including, for example, Wi-Fi, Bluetooth, Z-Wave, ZigBee, among others.

Figure 7:
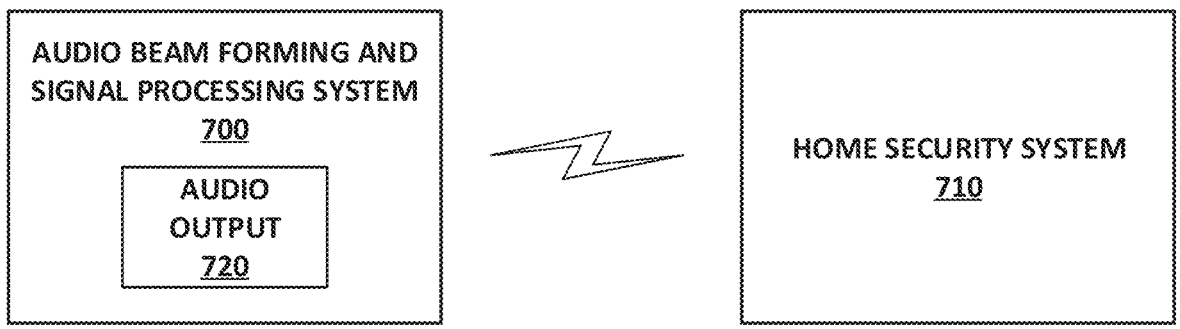
FIG. 7 depicts an example audio beam forming and signal processing system in accordance with this disclosure communicatively connected to a second system.

FIG. 7 depicts example audio beam forming and signal processing system 700 in accordance with this disclosure communicatively connected to home security system 710. In the example of FIG. 7, system 700 communicates with home security system 710 wirelessly using, for example, Bluetooth, Z-Wave, Zigbee, among others. In another example, however, system 700 can communicated with home security system 710 over a wired connection.

Systems and methods in accordance with this disclosure may improve detection and processing of far field audio signals to improve speech recognition and processing by electronic devices/systems. Examples according to this disclosure are applicable to a variety of practical technical applications, including, for example, home/premises/facility security and/or automation, Personal Emergency Response systems (PERS), physical access control systems, among others. In the example of FIG. 7, system 700 is connected to and augments/improves the functionality of home security system 710. However, in other examples an audio beam forming and signal processing system can be connected to and augment/improve the functionality of a variety of additional electronic systems.

System 700 is configured to locate, target and track an audio source with an audio beam that is defined by two or fewer audio source location parameters. System 700 can be configured and function in accordance with any or all of the examples of FIGS. 1-6 described above. For example, system 700 can be configured to form an audio beam directed at a person vocalizing commands or other information for execution/use by home security system 710 using one or both of an angle in a horizontal plane generally parallel to a reference datum plane and/or an angle in a vertical plane generally perpendicular to the reference datum plane.

System 700 can process the audio signals from the audio beam formed thereby for a number of different purposes and to execute a number of different functions. For example, system 700 can be configured to execute speech recognition algorithms to receive and execute commands vocalized by a user of the system. For example, a controller of system 700 can be programmed to execute a speech-to-text (STT) algorithm to transpose audio signals received by the audio beam formed by system 700 to text. In one example, system 700 uses the Pocketsphinx STT engine developed by Carnegie Mellon University and released under the BSD open source license.

Additionally, in some examples, system 700 includes an audio output device, including, for example, one or more speakers and is configured to output audio signals perceivable by users as speech. In such cases, system 700 may include and execute Text-to-Speech (TTS) algorithm(s) to transpose the command vocalized by the user and processed by system 700 into audio signals output by the speaker(s). In one example, system 700 includes and is configured to execute the eSpeak TTS algorithm available at espeak.sourceforge.net and released under the GNU open source license. In this manner, system 700 can provide feedback to users to, as examples, confirm vocalized commands or execution thereof.

In one example, commands or other types of input received from a user and recognized by system 700 can be communicated to a second system, for example, home security system 710. Home security system 710 can be configured to cause various results, actions, effects, et cetera to occur including, for example, arming/disarming a security alarm of a home, lock/unlock a door, open/close a garage door, among others.

Figure 8:
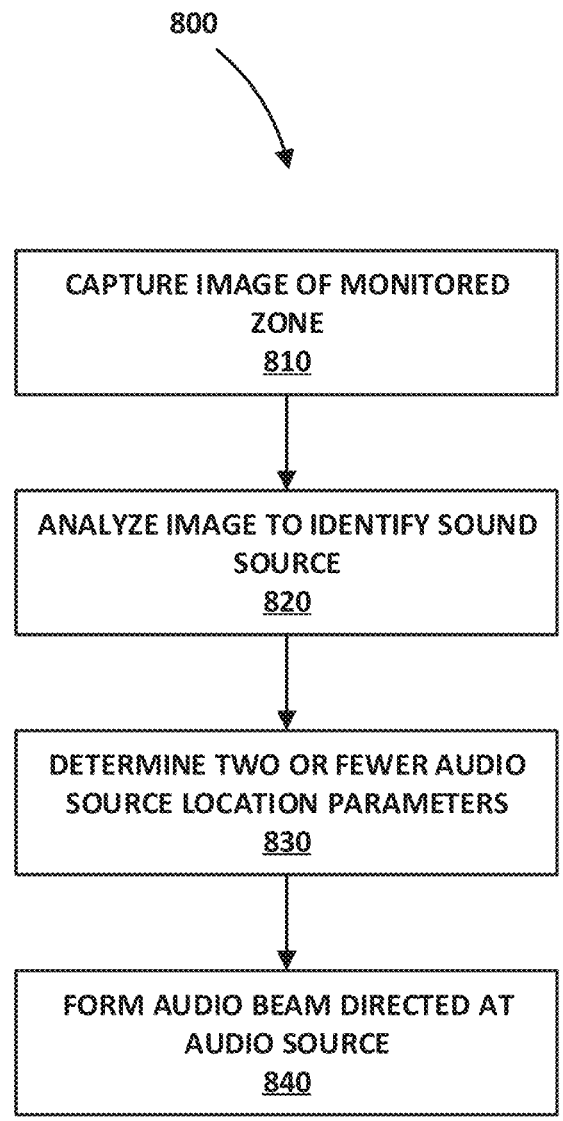
FIG. 8 is a flowchart depicting a method in accordance with this disclosure.

FIG. 8 is a flowchart depicting method 800 in accordance with this disclosure. Method 800 includes capturing at least one image of a monitored zone using an image capture device (810), analyzing, by a controller, the at least one image captured by the image capture device to identify an audio source within the monitored zone (820), determining, by the controller, two or fewer audio source location parameters indicative of the location of the audio source in the monitored zone (830), and forming, by an array of audio sensors, an audio beam directed at the audio source based on the two or fewer audio source location parameters (840). Method 800 can be executed by example audio beam forming and signal processing systems in accordance with this disclosure. For example, method 800 can be executed by any of the examples of FIGS. 1-5B and including a controller in accordance with the example of FIG. 6.

In one example, an image capture device included in an audio beam forming and signal processing system captures one or more images of a monitored zone, for example, a room within a house or other building. The image capture device is communicatively connected to a controller of the system and the images can be processed by and/or stored on memory of the controller.

The controller is configured to analyze the images to identify a source of sound of potential interest, for example, a person. The controller can identify the sound source in the image by, for example, executing one or more computer vision and/or object detection/recognition algorithms.

The controller determines two or more audio source location parameters indicative of the location of the audio source in the monitored zone. For example, the controller determines one or both of an angle in a horizontal plane generally parallel to a reference datum plane and/or an angle in a vertical plane generally perpendicular to the reference datum plane. The reference datum plane can be, but does not necessarily have to be the ground, floor or other planar surface upon which audio source stands, sits, lies, et cetera.

The controller causes an audio sensor array of the audio beam forming and signal processing system to form an audio beam directed at the audio source using the two or fewer audio source location parameters. For example, the controller causes the audio sensor array to form the audio beam using one or both of the horizontal angle and the vertical angle. In the case of using the horizontal angle, the audio beam can be horizontally aligned with the audio source and vertically elongated. In the case of using the vertical angle, the audio beam can be vertically aligned with the audio source and horizontally elongated. In the case of using both the horizontal and vertical angles, the controller can calculate a first audio beam horizontally aligned with the audio source and vertically elongated, calculate a second audio beam vertically aligned with the audio source and horizontally elongated, and can cause the audio sensor array to form a third audio beam as a sum of the first calculated audio beam and the second calculated audio beam.

NOTES & EXAMPLES

The present application provides for the following exemplary embodiments or examples, the numbering of which is not to be construed as designating levels of importance:

Example 1 provides an audio beam forming and signal processing system comprising: at least one image capture device configured to capture images of a monitored zone; and an array of audio sensors configured to detect audio signals from one or more audio sources within the monitored zone; and a controller configured to: analyze at least one image captured by the image capture device to identify an audio source within the monitored zone; determine two or fewer audio source location parameters indicative of the location of the audio source in the monitored zone; and cause the array of audio sensors to form an audio beam directed at the audio source based on the two or fewer audio source location parameters.

Example 2 provides the system of Example 1 and optionally wherein: the controller is configured to cause the array of audio sensors to form the audio beam based on one audio source location parameter, the one audio source location parameter indicative of a position of the audio source in a first direction in the monitored zone; and the audio beam formed by the array of audio sensors is aligned with the audio source in the first direction and is elongated in a second direction perpendicular to the first direction.

Example 3 provides the system of Examples 1 and 2 and optionally wherein the first direction comprises horizontal and the second direction comprises vertical, and wherein the audio beam is horizontally aligned with the audio source and is vertically elongated.

Example 4 provides the system of Examples 1 and 2 and optionally wherein the first direction comprises vertical and the second direction comprises horizontal, and wherein the audio beam is vertically aligned with the audio source and is horizontally elongated.

Example 5 provides the system of Example 1 and optionally wherein: the controller is configured to cause the array of audio sensors to form the audio beam based on first and second audio source location parameters, the first audio source location parameter indicative of a position of the audio source in a first direction in the monitored zone and the second audio source location parameter indicative of the position of the audio source in a second direction in the monitored zone, the first and second directions being perpendicular to one another; and the audio beam formed by the array of audio sensors is aligned with the audio source in the first and second directions.

Example 6 provides the system of Examples 1 and 5 and optionally wherein the controller causing the array of audio sensors to form the audio beam comprises: calculating a first audio beam that is aligned with the audio source in the first direction and is elongated in the second direction; calculating a second audio beam that is aligned with the audio source in the second direction and is elongated in the first direction; and causing the array of audio sensors to form the audio beam as a sum of the first calculated audio beam and the second calculated audio beam.

Example 7 provides the system of Examples 1, 5 and 6 and optionally wherein the first direction comprises horizontal and the second direction comprises vertical, and wherein the first calculated audio beam is horizontally aligned with the audio source and vertically elongated and the second calculated audio beam is vertically aligned with the audio source and horizontally elongated.

Example 8 provides the system of Example 1 and optionally wherein the two or fewer audio source location parameters comprise at least one of: an angle in a plane parallel to a reference datum plane upon which the audio source is arranged, the angle indicative of a horizontal position of the audio source in the monitored zone; and an angle in a plane perpendicular to the reference datum plane, the angle indicative of a vertical position of the audio source in the monitored zone.

Example 9 provides the system of Examples 1 and 8 and optionally further comprising one or more servo motors connected to the image capture device and configured to at least one of pan the image capture device horizontally and tilt the image capture device vertically.

Example 10 provides the system of Examples 1, 8 and 9 and optionally wherein the controller determining the two or fewer audio source location parameters comprises: at least one of controlling the one or more servo motors to center a field of view of the image capture device horizontally on the audio source and controlling the one or more servo motors to center a field of view of the image capture device vertically on the audio source; and reading, from the one or more servo motors, at least one of a horizontal and a vertical angle of the one or more servo motors, the at least one of the horizontal and the vertical angle being at least one of the angle in the plane parallel to the reference datum plane and the angle in the plane perpendicular to the reference datum plane, respectively.

Example 11 provides the system of Examples 1, 8, 9 and 10 and optionally wherein the controller causing the array of audio sensors to form the audio beam comprises: calculating a first audio beam using the angle in the plane parallel to the reference datum plane, the first audio beam being aligned with the audio source horizontally and elongated vertically; calculating a second audio beam using the angle in the plane perpendicular to the reference datum plane, the second audio beam being aligned with the audio source vertically and elongated horizontally; and causing the array of audio sensors to form the audio beam as a sum of the first calculated audio beam and the second calculated audio beam.

Example 12 provides the system of Examples 1 and 8 and optionally wherein the controller is configured to determine at least one of the angle in the plane parallel to the reference datum plane and the angle in the plane perpendicular to the reference datum plane based on at least one of a resolution of the at least one image captured by the image capture device and a lens angle of the image capture device.

Example 13 provides the system of Example 1 and optionally wherein the controller is configured to determine the two or fewer audio source location parameters based on at least one of a resolution of the at least one image captured by the image capture device and a lens angle of the image capture device.

Example 14 provides the system of Example 1 and optionally wherein: the audio source comprises a person; the audio signals represent a command vocalized by the person; and the controller is configured to: process the audio signals to recognize the command vocalized by the person; and transmit signals representing the command to a second system, the second system configured to execute a function of the second system in response to receiving the signals representing the command.

Example 15 provides the system of Examples 1 and 14 and optionally further comprising an audio output device, and wherein the controller is configured to cause the audio output device to output signals perceivable by the person as a vocalization of the command.

Example 16 provides the system of Example 1 and optionally wherein the audio beam directed at the audio source is a first audio beam, and wherein the controller is configured to: analyze at least one image captured by the image capture device to identify a source of noise within the monitored zone; determine one or more parameters indicative of the location of the source of noise in the monitored zone; cause the array of audio sensors to form a second audio beam directed at the source of noise based on the one or more parameters; and filter audio signals detected by the first audio beam using noise signals detected by the second audio beam.

Example 17 provides a system comprising: an audio beam forming and signal processing system; and a second system, wherein the audio beam forming and audio signal processing system comprises: at least one image capture device configured to capture images of a monitored zone; and an array of audio sensors configured to detect audio signals from one or more audio sources within the monitored zone; a controller configured to: analyze at least one image captured by the image capture device to identify an audio source within the monitored zone; determine two or fewer audio source location parameters indicative of the location of the audio source in the monitored zone; cause the array of audio sensors to form an audio beam directed at the audio source based on the two or fewer audio source location parameters; and transmit audio signals detected by the audio beam or a representation of the audio signals to the second system, and wherein the second system is configured to execute a function of the second system in response to receiving the audio signals or the representation thereof from the audio beam forming and signal processing system.

Example 18 provides the system of Example 17 and optionally wherein the second system comprises at least one of a home security system, a home automation system, a physical access control system, and a Personal Emergency Response system.

Example 19 provides the system of Example 17 and optionally wherein: the controller is configured to cause the array of audio sensors to form the audio beam based on one audio source location parameter, the one audio source location parameter indicative of a position of the audio source in a first direction in the monitored zone; and the audio beam formed by the array of audio sensors is aligned with the audio source in the first direction and is elongated in a second direction perpendicular to the first direction.

Example 20 provides the system of Example 17 and optionally wherein: the controller is configured to cause the array of audio sensors to form the audio beam based on first and second audio source location parameters, the first audio source location parameter indicative of a position of the audio source in a first direction in the monitored zone and the second audio source location parameter indicative of the position of the audio source in a second direction in the monitored zone, the first and second directions being perpendicular to one another; and the audio beam formed by the array of audio sensors is aligned with the audio source in the first and second directions.

Example 21 provides the system of Examples 17 and 20 and optionally wherein the controller causing the array of audio sensors to form the audio beam comprises: calculating a first audio beam that is aligned with the audio source in the first direction and is elongated in the second direction; calculating a second audio beam that is aligned with the audio source in the second direction and is elongated in the first direction; and causing the array of audio sensors to form the audio beam as a sum of the first calculated audio beam and the second calculated audio beam.

Example 22 provides the system of Example 17 and optionally wherein the audio beam directed at the audio source is a first audio beam, and wherein the controller is configured to: analyze at least one image captured by the image capture device to identify a source of noise within the monitored zone; determine one or more parameters indicative of the location of the source of noise in the monitored zone; cause the array of audio sensors to form a second audio beam directed at the source of noise based on the one or more parameters indicative of the location of the source of noise in the monitored zone; and filter audio signals detected by the first audio beam using noise signals detected by the second audio beam.

Example 23 provides a method comprising: capturing at least one image of a monitored zone using an image capture device; analyzing, by a controller, the at least one image captured by the image capture device to identify an audio source within the monitored zone; determining, by the controller, two or fewer audio source location parameters indicative of the location of the audio source in the monitored zone; and forming, by an array of audio sensors, an audio beam directed at the audio source based on the two or fewer audio source location parameters.

Example 24 provides the system of Example 23 and optionally comprising forming the audio beam based on one audio source location parameter, the one audio source location parameter indicative of a position of the audio source in a first direction in the monitored zone, and the audio beam formed by the array of audio sensors being aligned with the audio source in the first direction and is elongated in a second direction perpendicular to the first direction.

Example 25 provides the system of Example 23 and optionally comprising forming the audio beam based on first and second audio source location parameters, the first audio source location parameter indicative of a position of the audio source in a first direction in the monitored zone, the second audio source location parameter indicative of the position of the audio source in a second direction in the monitored zone, the first and second directions being perpendicular to one another, and the audio beam formed by the array of audio sensors being aligned with the audio source in the first and second directions.

Example 26 provides the system of Examples 23 and 25 and optionally wherein forming the audio beam based on the first and second audio source location parameters comprises: calculating, by the controller, a first audio beam that is aligned with the audio source in the first direction and is elongated in the second direction; calculating, by the controller, a second audio beam that is aligned with the audio source in the second direction and is elongated in the first direction; and forming, by the array of audio sensors, the audio beam as a sum of the first calculated audio beam and the second calculated audio beam.

Example 27 provides the system of Example 23 and optionally wherein the audio beam directed at the audio source is a first audio beam, and further comprising: analyzing, by the controller, at least one image captured by the image capture device to identify a source of noise within the monitored zone: determining, by the controller, one or more parameters indicative of the location of the source of noise in the monitored zone; forming, by the array of audio sensors, a second audio beam directed at the source of noise based on the one or more parameters indicative of the location of the source of noise in the monitored zone; and filtering, by the controller, audio signals detected by the first audio beam using noise signals detected by the second audio beam.

Various aspects of the disclosure have been described. These and other aspects are within the scope of the following claims.

What is claimed is:

1. A system comprising:
    at least one camera disposed to capture images of a monitored zone;
    an array of microphones disposed adjacent the at least one camera to detect audio signals from one or more audio sources within the monitored zone; and
    a controller circuit communicatively connected to the at least one camera and the array of microphones, the controller circuit being configured to:
    analyze at least one image captured by the at least one camera to identify an audio source within the monitored zone;
    determine two or fewer audio source location parameters indicative of the location of the audio source in the monitored zone; and
    cause the array of microphones to form an audio beam directed at the audio source based on the two or fewer audio source location parameters,
    wherein the two or fewer audio source location parameters comprise at least one of:
    an angle in a plane parallel to a reference datum plane upon which the audio source is arranged, the angle indicative of a horizontal position of the audio source in the monitored zone; and
    an angle in a plane perpendicular to the reference datum plane, the angle indicative of a vertical position of the audio source in the monitored zone; and
    wherein the audio beam is centered on one of the angle in the plane parallel to the reference datum plane or the angle in the plane perpendicular to the reference datum plane, and is elongated to a fixed width along the other of the angle in the plane parallel or the angle in the plane perpendicular, the fixed width spanning the monitored zone.

2. The system of claim 1, further comprising one or more servo motors connected to the at least one camera and configured to at least one of pan the at least one camera horizontally and tilt the at least one camera vertically.

3. The system of claim 2, wherein the controller circuit determining the two or fewer audio source location parameters comprises:
    at least one of controlling the one or more servo motors to center a field of view of the at least one camera horizontally on the audio source and controlling the one or more servo motors to center a field of view of the at least one camera vertically on the audio source; and
    reading, from the one or more servo motors, at least one of a horizontal and a vertical angle of the one or more servo motors, the at least one of the horizontal and the vertical angle being at least one of the angle in the plane parallel to the reference datum plane and the angle in the plane perpendicular to the reference datum plane, respectively.

4. The system of claim 3, wherein the controller circuit causing the array of audio sensors to form the audio beam comprises:
calculating a first audio beam using the angle in the plane parallel to the reference datum plane, the first audio beam being aligned with the audio source horizontally and elongated vertically;
calculating a second audio beam using the angle in the plane perpendicular to the reference datum plane, the second audio beam being aligned with the audio source vertically and elongated horizontally; and
causing the array of microphones to form the audio beam as a sum of the first calculated audio beam and the second calculated audio beam.

5. The system of claim 1, wherein the controller circuit is configured to determine at least one of the angle in the plane parallel to the reference datum plane and the angle in the plane perpendicular to the reference datum plane based on at least one of a resolution of the at least one image captured by the at least one camera and a lens angle of the at least one camera.

6. The system of claim 1, wherein the controller circuit is configured to determine the two or fewer audio source location parameters based on at least one of a resolution of the at least one image captured by the at least one camera and a lens angle of the at least one camera.

7. The system of claim 1, wherein:
the audio source comprises a person;
the audio signals represent a command vocalized by the person; and
the controller circuit is configured to:
process the audio signals to recognize the command vocalized by the person; and
transmit signals representing the command to a second system, the second system configured to execute a function of the second system in response to receiving the signals representing the command.

8. The system of claim 7, further comprising an audio output device, and wherein the controller circuit is configured to cause the audio output device to output signals perceivable by the person as a vocalization of the command.

9. The system of claim 1, wherein the audio beam directed at the audio source is a first audio beam, and wherein the controller circuit is configured to:
analyze at least one image captured by the at least one camera to identify a source of noise within the monitored zone;
determine one or more parameters indicative of the location of the source of noise in the monitored zone;
cause the array of microphones to form a second audio beam directed at the source of noise based on the one or more parameters; and
filter audio signals detected by the first audio beam using noise signals detected by the second audio beam.

10. The system of claim 1, wherein the audio beam is centered by determining a centerline of an image, determining that the object is located on a side of the centerline, and panning towards the side.

11. A system comprising:
at least one camera disposed to capture images of a monitored zone;
an array of microphones disposed adjacent the at least one camera to detect audio signals from one or more audio sources within the monitored zone; and
a controller circuit communicatively connected to the at least one camera and the array of microphones, the controller circuit being configured to:
analyze at least one image captured by the at least one camera to identify an audio source within the monitored zone;
determine two or fewer audio source location parameters indicative of the location of the audio source in the monitored zone; and
cause the array of microphones to form the audio beam based on one audio source location parameter, the one audio source location parameter indicative of a position of the audio source in a first direction in the monitored zone, the audio beam formed by the array of microphones being aligned with the audio source in the first direction and is elongated to a fixed width in a second direction perpendicular to the first direction, the fixed width spanning the monitored zone.

12. The system of claim 11, wherein the first direction comprises horizontal and the second direction comprises vertical, and wherein the audio beam is horizontally aligned with the audio source and is vertically elongated.

13. The system of claim 11, wherein the first direction comprises vertical and the second direction comprises horizontal, and wherein the audio beam is vertically aligned with the audio source and is horizontally elongated.

14. A system comprising:
at least one camera disposed to capture images of a monitored zone;
an array of microphones disposed adjacent the at least one camera to detect audio signals from one or more audio sources within the monitored zone; and
a controller circuit communicatively connected to the at least one camera and the array of microphones, the controller circuit being configured to:
analyze at least one image captured by the at least one camera to identify an audio source within the monitored zone;
determine two or fewer audio source location parameters indicative of the location of the audio source in the monitored zone; and
cause the array of microphones to form the audio beam based on first and second audio source location parameters, the first audio source location parameter indicative of a position of the audio source in a first direction in the monitored zone and the second audio source location parameter indicative of the position of the audio source in a second direction in the monitored zone, the first and second directions being perpendicular to one another; the audio beam formed by the array of audio sensors is being aligned with the audio source in the first and second directions,
wherein the controller circuit causing the array of audio sensors to form the audio beam comprises:
calculating a first audio beam that is aligned with the audio source in the first direction and is elongated to a fixed width in the second direction;
calculating a second audio beam that is aligned with the audio source in the second direction and is elongated to a fixed width in the first direction; and
causing the array of microphones to form the audio beam as a sum of the first calculated audio beam and the second calculated audio beam, the fixed width spanning the monitored zone.

15. The system of claim 14, wherein the first direction comprises horizontal and the second direction comprises vertical, and wherein the first calculated audio beam is horizontally aligned with the audio source and vertically elongated and the second calculated audio beam is vertically aligned with the audio source and horizontally elongated.

16. A system comprising:
a first sub-system; and
a speech-recognition circuit communicatively connected to the first sub-system,
wherein the first sub-system comprises:
at least one camera disposed to capture images of a monitored zone;
an array of microphones disposed adjacent the at least one camera to detect audio signals from one or more audio sources within the monitored zone; and
a controller circuit communicatively connected to the at least one camera and the array of microphones, the controller circuit being configured to:
analyze at least one image captured by the at least one camera to identify an audio source within the monitored zone;
determine two or fewer audio source location parameters indicative of the location of the audio source in the monitored zone; and
cause the array of microphones to form the audio beam based on first and second audio source location parameters, the first audio source location parameter indicative of a position of the audio source in a first direction in the monitored zone and the second audio source location parameter indicative of the position of the audio source in a second direction in the monitored zone, the first and second directions being perpendicular to one another, the audio beam formed by the array of microphones being aligned with the audio source in the first and second directions; and
transmit audio signals detected by the audio beam or a representation of the audio signals to the speech-recognition circuit; and
wherein the speech-recognition circuit is configured to execute a function of the speech-recognition circuit in response to receiving the audio signals or the representation thereof from the first sub-system, the function including transpose speech from the audio signals or the representation of the audio signals; and
wherein the controller circuit is configured to cause the array of microphones to form the audio beam based on one audio source location parameter, the one audio source location parameter indicative of a position of the audio source in a first direction in the monitored zone; and
the audio beam formed by the array of microphones is aligned with the audio source in the first direction and is elongated to a fixed width in a second direction perpendicular to the first direction, the fixed width spanning the monitored zone.

17. The system of claim 16, wherein the second system comprises at least one of a home security system, a home automation system, a physical access control system, and a Personal Emergency Response system.

18. The system of claim 16, wherein the controller circuit causing the array of microphones to form the audio beam comprises:
calculating a first audio beam that is aligned with the audio source in the first direction and is elongated in the second direction;
calculating a second audio beam that is aligned with the audio source in the second direction and is elongated in the first direction; and
causing the array of microphones to form the audio beam as a sum of the first calculated audio beam and the second calculated audio beam.

19. The system of claim 16, wherein the audio beam directed at the audio source is a first audio beam, and wherein the controller circuit is configured to:
analyze at least one image captured by the at least one camera to identify a source of noise within the monitored zone;
determine one or more parameters indicative of the location of the source of noise in the monitored zone;
cause the array of microphones to form a second audio beam directed at the source of noise based on the one or more parameters indicative of the location of the source of noise in the monitored zone; and
filter audio signals detected by the first audio beam using noise signals detected by the second audio beam.

20. A method comprising:
capturing at least one image of a monitored zone using a camera disposed to capture images of the monitored zone;
analyzing, by a controller circuit, the at least one image captured the camera to identify an audio source within the monitored zone;
determining, by the controller circuit, two or fewer audio source location parameters indicative of the location of the audio source in the monitored zone; and
forming, by an array of microphones disposed adjacent the at least one camera, an audio beam directed at the audio source based on the two or fewer audio source location parameters,
wherein the two or fewer audio source location parameters comprise at least one of:
an angle in a plane parallel to a reference datum plane upon which the audio source is arranged, the angle indicative of a horizontal position of the audio source in the monitored zone; and
an angle in a plane perpendicular to the reference datum plane, the angle indicative of a vertical position of the audio source in the monitored zone; and
wherein the audio beam is centered on one of the angle in the plane parallel to the reference datum plane or the angle in the plane perpendicular to the reference datum plane, and is elongated to a fixed width along the other of the angle in the plane parallel or the angle in the plane perpendicular, the fixed width spanning the monitored zone.

* * * * *